(12) United States Patent
Darden et al.

(10) Patent No.: US 10,586,009 B2
(45) Date of Patent: Mar. 10, 2020

(54) HIERARCHICAL TRIM MANAGEMENT FOR SELF-ALIGNED DOUBLE PATTERNING

(71) Applicant: International Business Machines Corporation, Armonk, NY (US)

(72) Inventors: Laura R. Darden, Ridgedale, MO (US); David Wolpert, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 15/838,520

(22) Filed: Dec. 12, 2017

(65) Prior Publication Data

US 2019/0179994 A1    Jun. 13, 2019

(51) Int. Cl.
*G06F 17/50* (2006.01)

(52) U.S. Cl.
CPC ...... *G06F 17/5072* (2013.01); *G06F 17/5081* (2013.01); *G06F 2217/12* (2013.01)

(58) Field of Classification Search
USPC ........................................................ 716/119
See application file for complete search history.

(56) References Cited

U.S. PATENT DOCUMENTS

| | | | |
|---|---|---|---|
| 8,549,458 B2 | 10/2013 | Sezginer | |
| 8,782,586 B2 | 7/2014 | Sezginer et al. | |
| 8,935,639 B1 | 1/2015 | Tzeng | |
| 9,117,052 B1 | 8/2015 | Salowe et al. | |
| 9,245,076 B2 | 1/2016 | Gerousis et al. | |
| 9,262,570 B2 | 2/2016 | Hsu et al. | |
| 9,613,177 B2* | 4/2017 | Yuan | G06F 17/5068 |
| 2006/0190889 A1* | 8/2006 | Cong | G06F 17/5072 716/122 |
| 2013/0145340 A1 | 6/2013 | Li | |
| 2014/0282289 A1* | 9/2014 | Hsu | G03F 7/70433 716/51 |
| 2015/0089457 A1* | 3/2015 | Agarwal | G03F 1/70 716/52 |
| 2015/0113484 A1* | 4/2015 | Yuan | G06F 17/5068 716/52 |
| 2015/0339428 A1* | 11/2015 | Yuan | G06F 17/5077 716/52 |
| 2017/0242953 A1 | 8/2017 | Pikus | |

OTHER PUBLICATIONS

Kodama et al. "Self-Aligned Double and Quadruple Patterning Aware Grid Routing Methods," IEEE Transactions on Computer-Aided Design of Integrated Circuits and Systems, May 2015, vol. 34, No. 5, pp. 753-765.

* cited by examiner

*Primary Examiner* — Mohammed Alam
(74) *Attorney, Agent, or Firm* — Cantor Colburn LLP; Margaret McNamara

(57) ABSTRACT

Embodiments of the invention are directed to methods, systems, and computer program products for the hierarchical management of self-aligned double patterning (SADP) trim shapes. Non-limiting embodiments of the invention include receiving, by a processor, one or more virtual trim shapes at a boundary between a parent hierarchy block and a child hierarchy block. The trim shapes are aligned to a legal trim grid. The processor then places one or more trim shapes aligned with the legal trim grid.

20 Claims, 16 Drawing Sheets

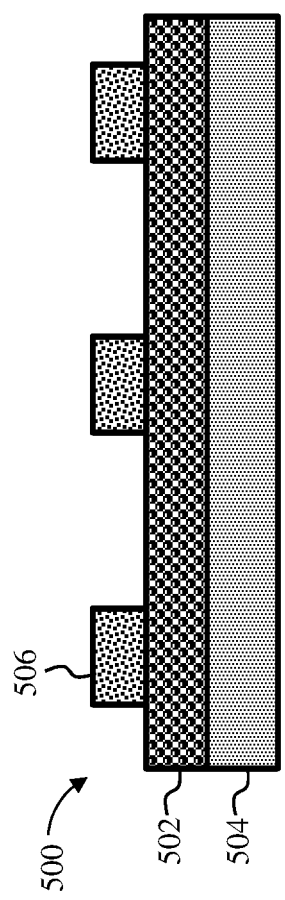
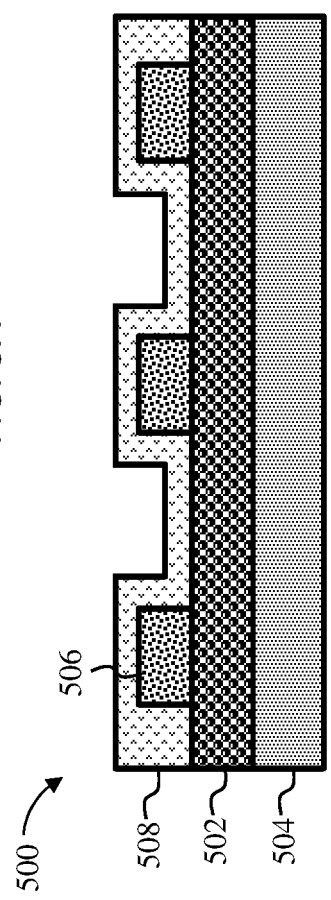
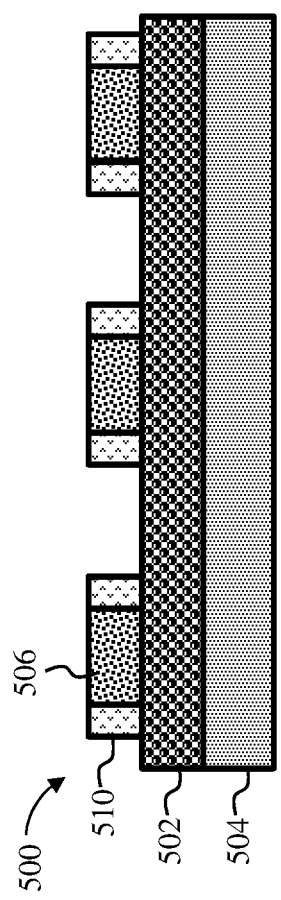

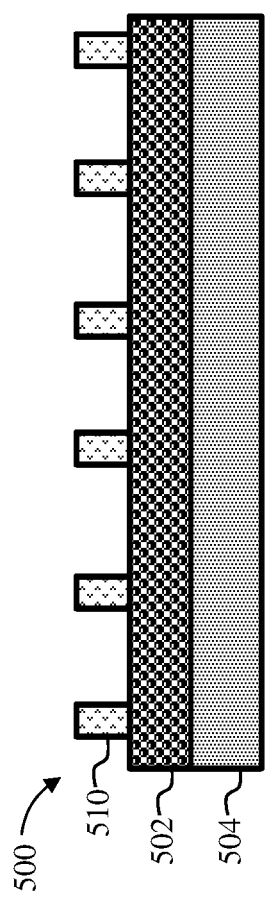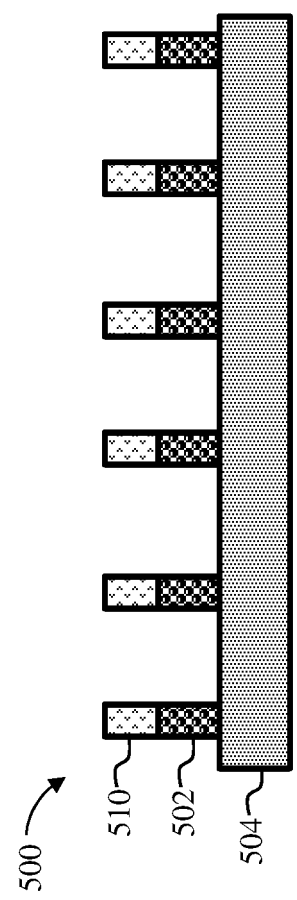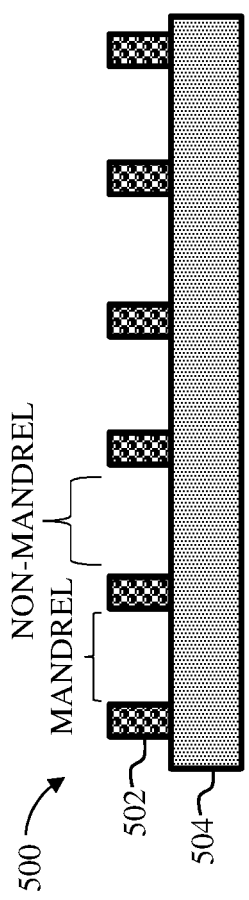

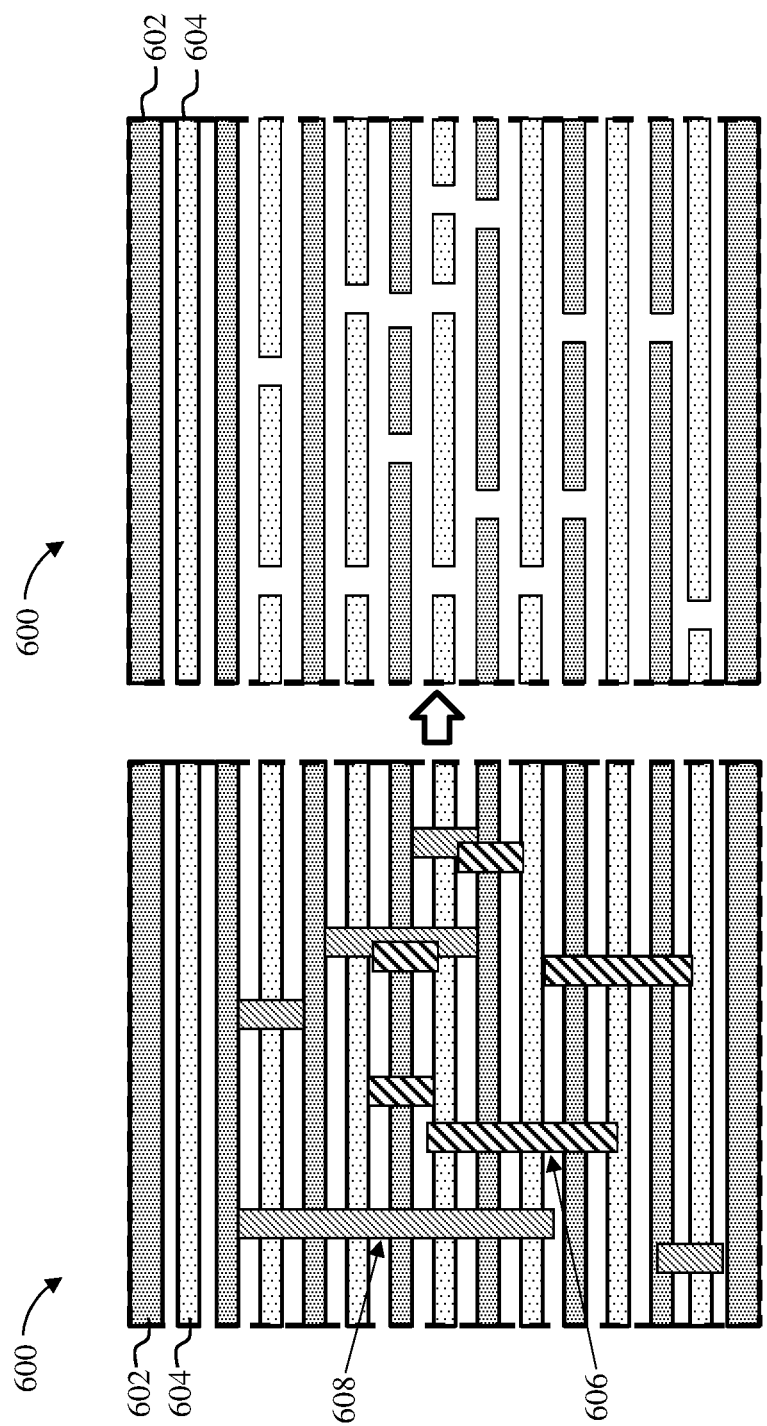

HIERARCHICAL TRIM MANAGEMENT FOR SELF-ALIGNED DOUBLE PATTERNING

BACKGROUND

The present invention generally relates to electronic design automation (EDA) for routing interconnections of integrated circuits (ICs) manufactured using a self-aligned double patterning (SADP) process. More specifically, the present invention relates to hierarchical management of self-aligned double patterning cut shapes or "trim shapes."

Conventional integrated circuits are created by patterning a wafer or substrate to form various devices and interconnections. The process for designing an IC begins generally by hierarchically defining functional components of the circuit using a hardware description language. From this high-level functional description, a physical circuit implementation dataset known as a netlist is created. In its simplest form, a netlist consists of a list of the electronic components in a circuit and a list of the nodes they are connected to (i.e., connectivity information).

A layout file is created using the netlist in a process known as placing and routing. The layout file assigns (i.e., places) logic cells to physical locations in the device layout and a software "router" or circuit designer routes their interconnections. In this manner, component devices and interconnections of the integrated circuit are constructed layer by layer. Once the layout file is generated, each layer is successively deposited onto the wafer and patterned using a photolithography process. These processes leverage one or more photomasks to transfer a layout pattern onto a physical layer on the wafer. Each photomask is created from the layout file of each wafer layer.

SUMMARY

Embodiments of the present invention are directed to a computer-implemented method for the hierarchical management of self-aligned double patterning (SADP) trim shapes. A non-limiting example of the computer-implemented method includes receiving, by a processor, one or more virtual trim shapes at a boundary between a parent hierarchy block and a child hierarchy block. The trim shapes are aligned to a legal trim grid. The processor then places one or more trim shapes aligned with the legal trim grid. The legal trim grid ensures that any trim shapes placed on either side of the parent-child hierarchical boundary will satisfy design rule checking because each side of the hierarchical boundary will have trim shapes either perfectly aligned with the other side, or sufficiently far away as to cause no spacing violations.

Embodiments of the present invention are directed to a system for the hierarchical management of SADP trim shapes. A non-limiting example of the system includes a processor configured to receive one or more virtual trim shapes at a boundary between a parent hierarchy block and a child hierarchy block. The trim shapes are aligned to a legal trim grid. The processor then places one or more trim shapes aligned with the legal trim grid.

Embodiments of the present invention are directed to a computer program product for the hierarchical management of SADP trim shapes. A non-limiting example of the computer program product includes program instructions executable by a processor to cause the processor to receive one or more virtual trim shapes at a boundary between a parent hierarchy block and a child hierarchy block. The trim shapes are aligned to a legal trim grid. The processor then places one or more trim shapes aligned with the legal trim grid.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 5A, 5B, 5C, 5D, 5E and 5F depict successive, cross-sectional views of a wafer during an intermediate operation of a method of fabricating a semiconductor device according to one or more embodiments of the invention;

FIGS. 6A and 6B depict successive top-down views of a single integrated circuit layer during an intermediate operation of a method of fabricating a semiconductor device according to one or more embodiments of the invention;

Figure 1:
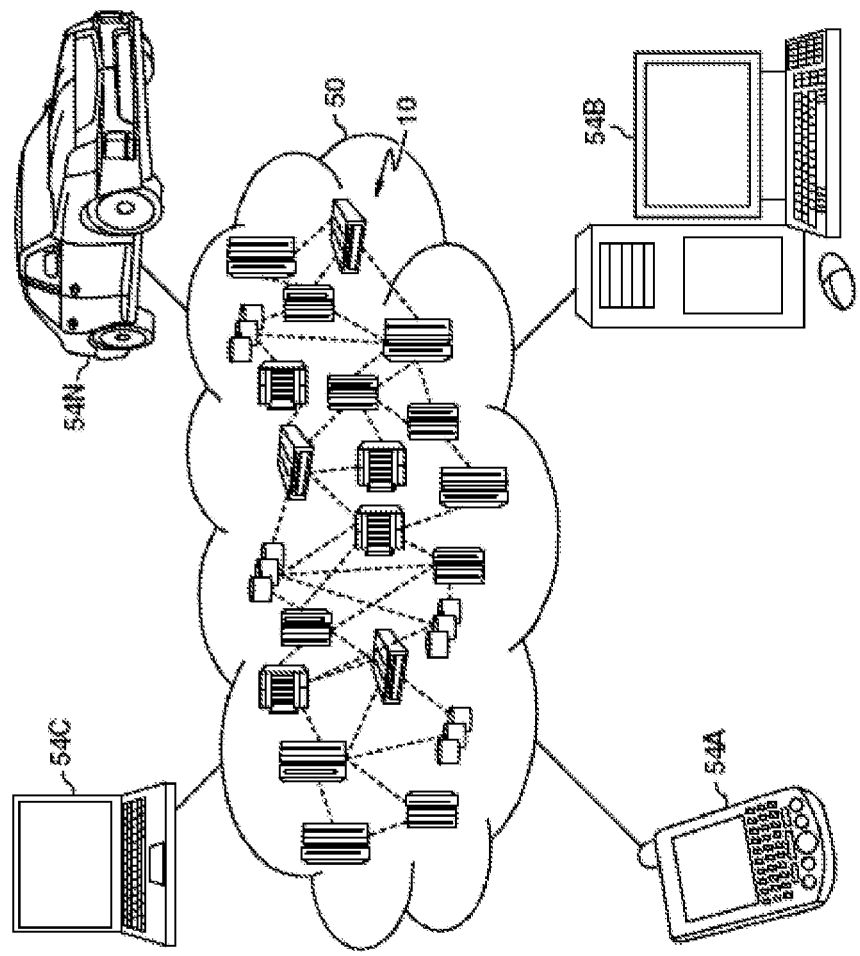
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to making and using aspects of the invention may or may not be described in detail herein. Aspects of the invention described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details. Conventional implementation details of various aspects of computing systems and specific computer programs used to implement the various technical features described herein are well known and are similarly only mentioned briefly or omitted entirely.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
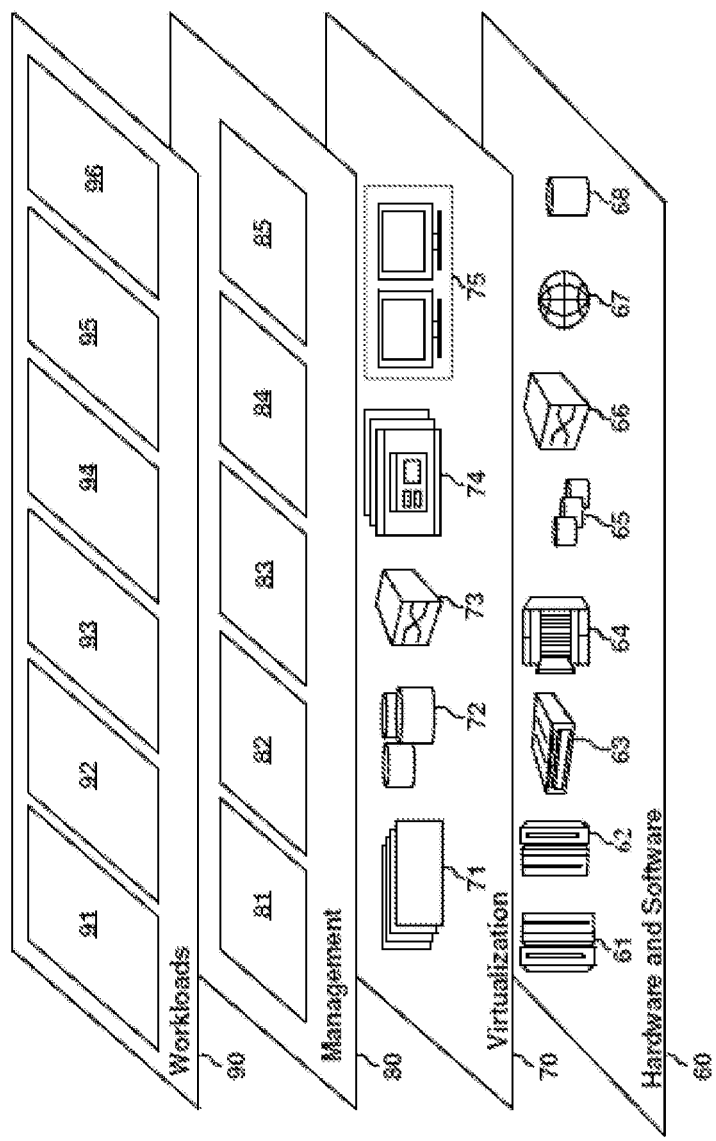
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical trim management 96.

Figure 3:
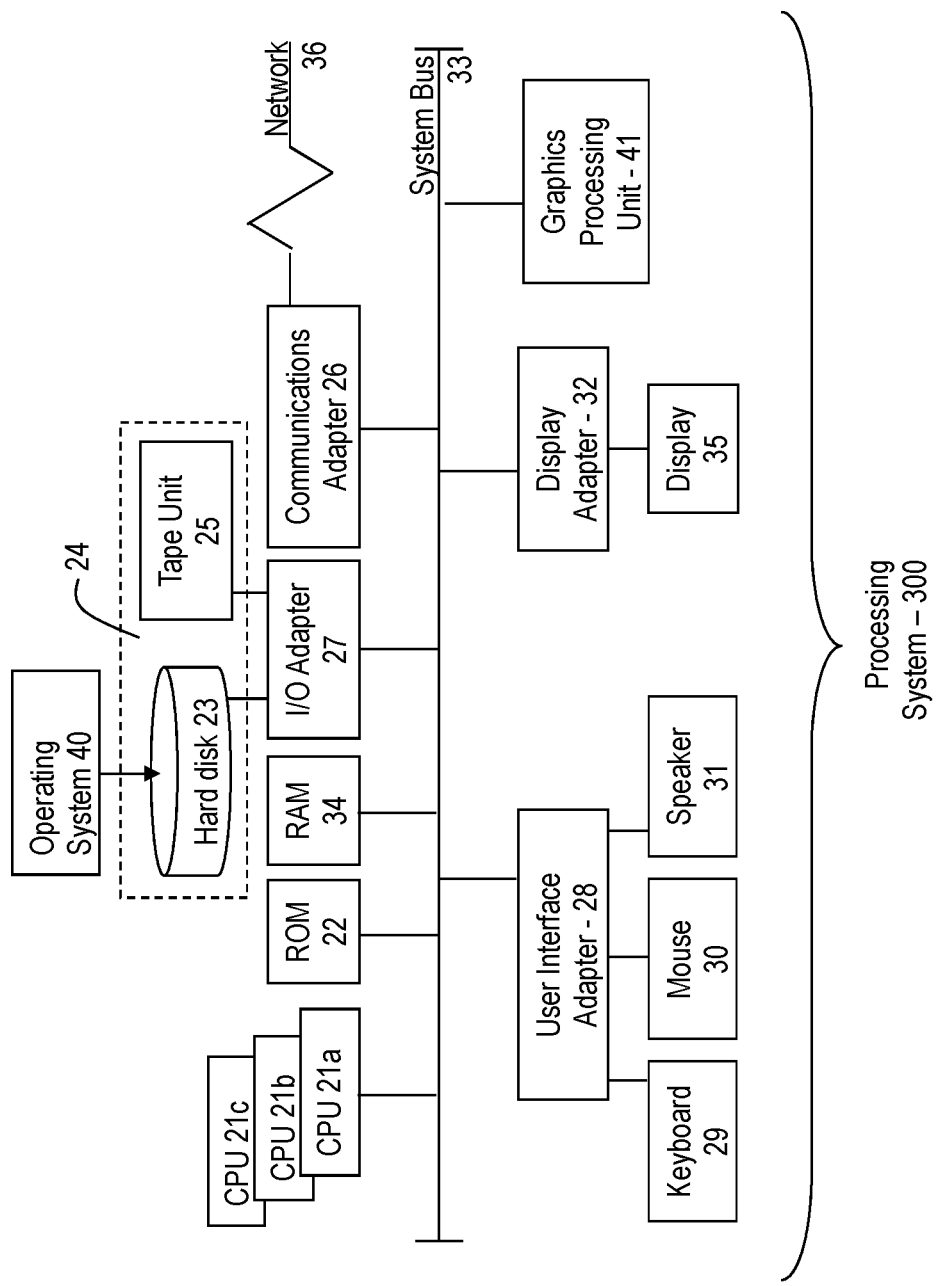
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the present invention, as previously noted herein, integrated circuits are created by patterning a wafer substrate to form various devices and interconnections. Patterning a wafer typically involves the use of one or more photomasks that are successively used to transfer a device layout pattern onto a physical layer on the wafer in a process known as photolithography. The ability to transfer an accurate pattern onto a wafer is limited by the wavelength of the light used and the ability of the lens system. Photolithography processes are based on 193 nm immersion lithography or extreme ultraviolet (EUV) lithography.

IC feature geometries are constantly being driven to smaller and smaller dimensions to meet increasing demands for smaller, more efficient, and faster electronic devices. As device features have continued to shrink, conventional single pattern photolithography processes are no longer sufficient. One class of technologies used to enhance feature density is referred to as double patterning or multiple patterning. There are several types of multiple patterning techniques in use, the most common being: litho-etch-litho-etch (LELE); litho-freeze-litho-etch (LFLE); and self-aligned double patterning (SADP), also known as spacer-assisted double patterning.

SADP leverages sidewall image transfer (SIT) to pattern wires and other device features at a smaller periodicity than is achievable using standard lithography. While SADP-based patterning can be used to enhance feature density, there are limitations to conventional approaches to implement sidewall image transfer. For example, when using SADP to pattern a wafer with a sea of wires, trim shapes must be used to define nets. Trim shapes are constrained by a set of trim spacing rules. These trim spacing rules prevent routing from ending a wire in a location that is too close to another wire end. In this manner, trim shapes can restrict signal track usages across one or more circuit rows or power bays. Accordingly, the valid locations available to a software router or circuit designer for placing trim shapes within a given hierarchical block are somewhat restricted. Unconstrained routers will cause trim spacing violations on one or more of the SADP layers when device features (e.g., signal lines, power rails) cross hierarchical boundaries. In some conventional approaches, these "across hierarchy" trim violations are prevented by forming a circuit row at the hierarchical border filled with dummy cells. This approach, however, represents an area penalty that limits scaling. In other conventional processes, across hierarchy trim violations are minimized by restricting router access near each hierarchical boundary. Ideally, however, it is advantageous not to constrain a router in general away from a hierarchical boundary, as a blanket trim shape restriction limits design space.

Turning now to an overview of aspects of the present invention, one or more embodiments of the invention provide a hierarchical trim management system for self-aligned double patterning. Instead of allowing an unrestricted router to cause trim violations across hierarchy, trim locations are restricted by virtual child blockages tied to a fixed grid and offset. These child blockages ensure grid and trim consistency across hierarchy levels without restricting the router in general away from hierarchy boundaries.

Figure 4:
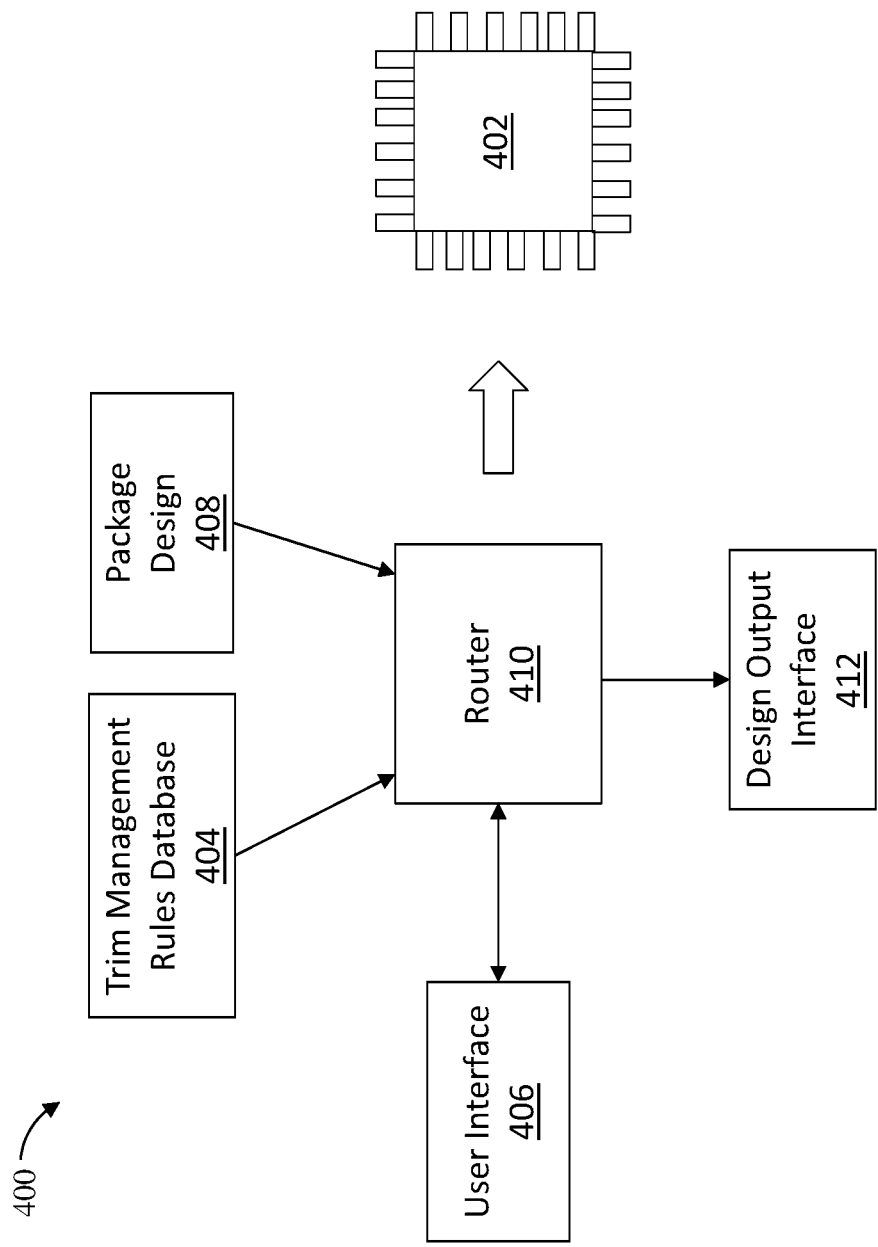
FIG. 4 depicts a block diagram of a system for providing hierarchical trim management within self-aligned double patterning processes according to one or more embodiments of the present invention.

Turning now to a more detailed description of aspects of the present invention, FIG. 4 depicts a system 400 for providing hierarchical trim management within self-aligned double patterning processes and the resulting physical implementation of a semiconductor package 402 formed according to one or more embodiments of the present invention. The system 400 includes a trim management rules database 404, a user interface 406, a package design database 408, a router 410, and a design output interface 412. In one or more embodiments of the invention, the router 410 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein. In some embodiments of the present invention, the router 410 is used to physically implement a semiconductor package or integrated circuit that satisfies hierarchical trim management rules and the system 400 includes the resulting physical implementation of the semiconductor package 402. Once the metallization layers of the chip have been designed or otherwise modified to satisfy the hierarchical trim management rules, the semiconductor package 402 can be physically implemented using known semiconductor package or integrated circuit fabrication techniques.

In one or more embodiments of the invention, the router 410 is configured to receive hierarchical trim management rules from the trim management rules database 404, a package design from the package design database 408, and a package designer's (user's) input from the user interface 406. In some embodiments of the present invention, a user can input additional or custom hierarchical trim management rules into the router 410 which can supplement or replace the hierarchical trim management rules stored in the trim management rules database 404. The package design can be loaded from the package design database 408 or provided by the user using the user interface 406. In some embodiments of the present invention, the user can build up a new package design using the user interface 406.

The package design includes a description of all of the features of a particular circuit. In some embodiments of the present invention, the package design includes a list of all package hierarchy layers, the location and layout of all hierarchies, and the location and layout of all mandrel and non-mandrel lines within each hierarchy. It is understood that these parameters are exemplary and that a package design can include additional or different elements.

Figure 11:
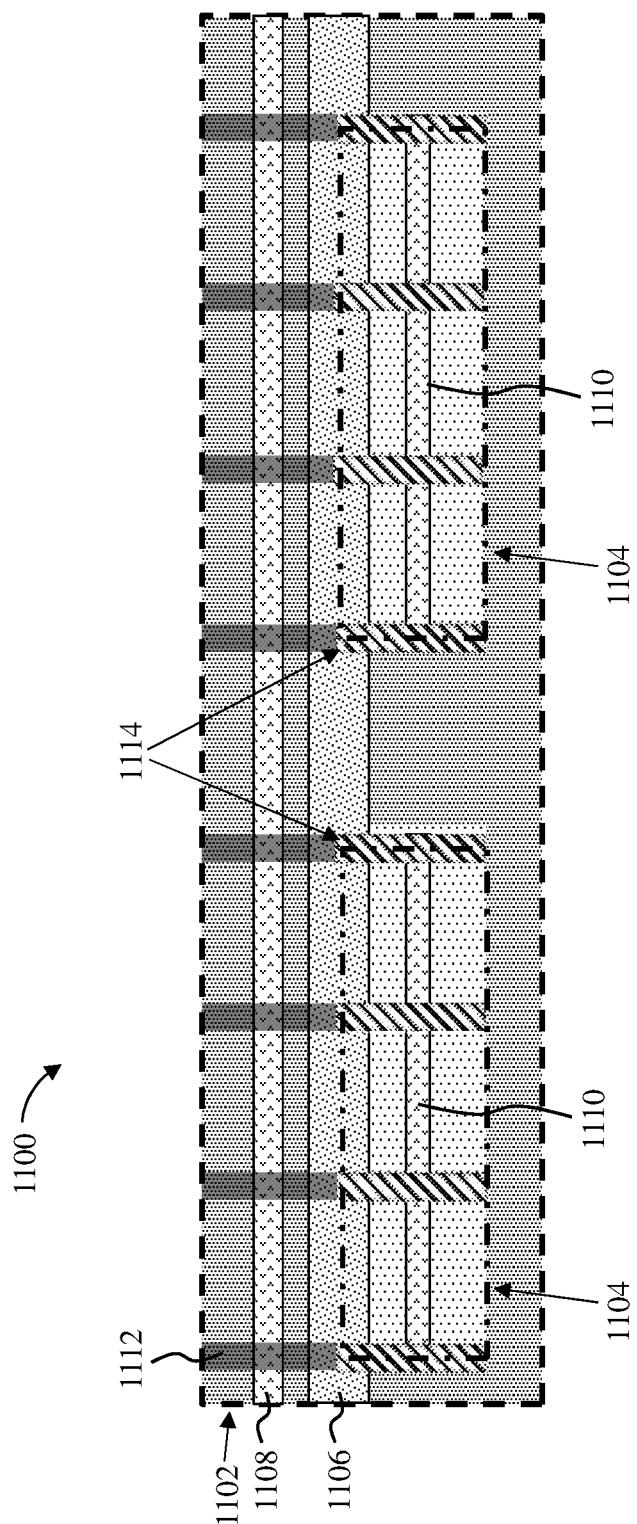
FIG. 11 depicts a top-down view of an integrated circuit during an intermediate operation of a method of trim patterning using trim abutment in a hierarchical trim management system according to one or more embodiments of the invention.
Figure 12:
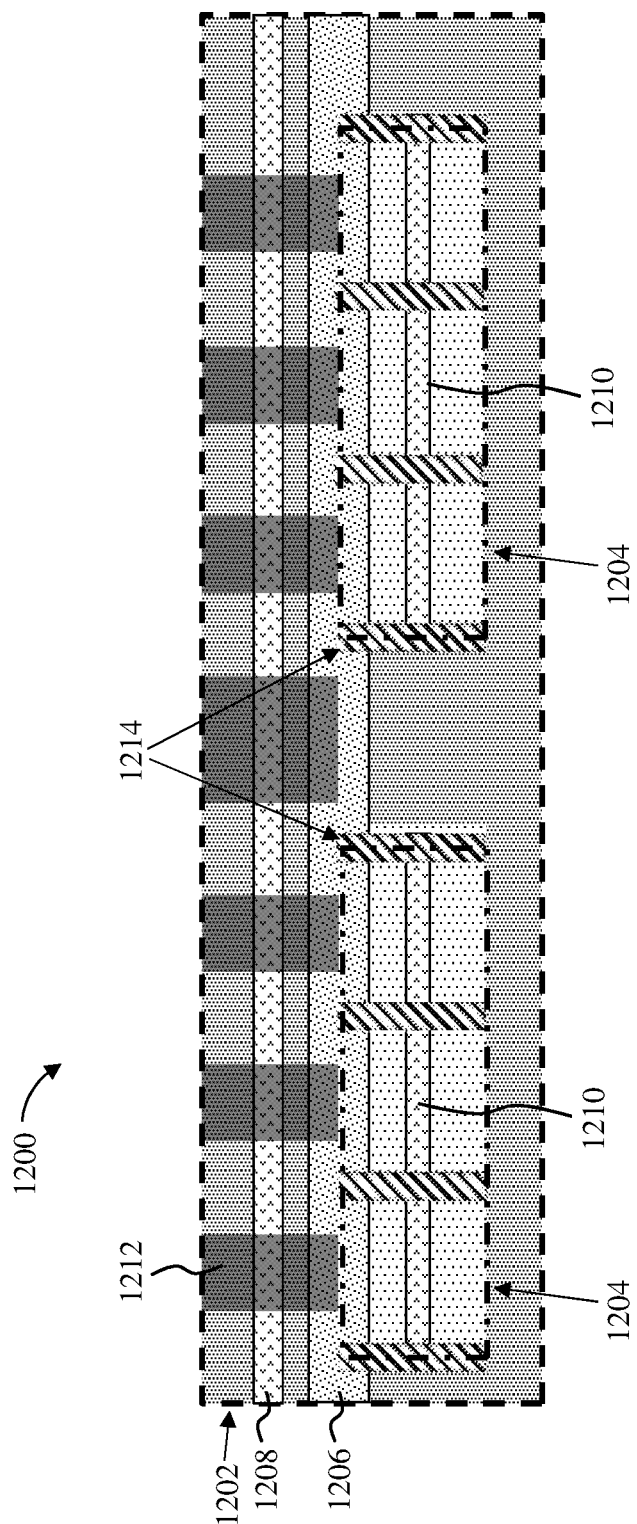
FIG. 12 depicts a top-down view of an integrated circuit during an intermediate operation of a method of trim patterning using trim lockouts in a hierarchical trim management system according to one or more embodiments of the invention.

The trim management rules include router constraints for placing trim in the semiconductor package. For example, a first trim management rule can force any trim placed by the router 410 in a current hierarchy to abut a virtual blockage shape represented from a child or parent hierarchy (as depicted in FIG. 11). A second trim management rule can designate one or more keep-out regions wherein trim cannot be legally placed by the router 410 (as depicted in FIG. 12). It is understood that these trim management rules are merely exemplary and that other trim management rules having various complexities are possible.

The router 410 receives the trim management rules from the trim management rules database 404 and/or the user interface 406 and the package design from the package design database 408 and/or the user interface 406. The router 410 then generates one or more trim shapes that satisfy the trim management rules across all package hierarchies according to one or more embodiments of the present invention.

FIGS. 5A-5F each depict a successive, cross-sectional view of a wafer 500 during an intermediate operation of a method of fabricating a semiconductor device according to one or more embodiments of the invention. As depicted in FIG. 5A, a hard mask layer 502 (also known as an etch layer) is formed over a surface of a substrate 504. One or more sacrificial mandrels 506 are formed on a surface of the hard mask layer 502. The wafer 500 can be any suitable substrate containing a semiconductor material for forming an integrated circuit. For example, the wafer 500 can be composed of a monocrystalline silicon-containing material, such as bulk or SOI single crystal silicon. In other embodiments of the present invention, the wafer 500 includes SiGe, SiC, III-V compound semiconductor, II-VI compound semiconductor, or semiconductor-on-insulator (SOI). In some embodiments of the invention, the substrate includes a buried oxide layer (not depicted). In some embodiments of the present invention, the semiconductor material constituting wafer 500 can be lightly doped with an impurity to alter its electrical properties. Specifically, the wafer 500 can be doped with an n-type impurity (e.g., phosphorus or arsenic) to render it initially n-type or can be doped with a p-type impurity (e.g., Ga, B, $BF_2$, or Al) to render it initially p-type. The dopant concentration in the doped regions can range from $1\times10^{19}$ $cm^{-3}$ to $2\times10^{21}$ $cm^{-3}$, or between $1\times10^{20}$ $cm^{-3}$ and $1\times10^{21}$ $cm^3$. Standard round wafer sizes for wafer 500 range from a diameter of about 100 mm to a diameter of 300 mm, although other wafer sizes are within the contemplated scope of the invention. The hard mask layer 502 can be any suitable hard mask material, such as, for example, a silicon nitride. The sacrificial mandrels 506 can be any suitable mandrel material, such as, for example, a photoresist material, a nitride, an oxide, and a silicon nitride.

As depicted in FIG. 5B, a spacer layer 508 is conformally formed over the wafer 500. In some embodiments of the present invention, the spacer layer 508 can include a dielectric material, such as silicon oxide, silicon nitride, silicon oxynitride, SiCO, or a combination thereof, and can be formed using known deposition processes. In some embodiments of the present invention, the spacer layer 508 is conformally deposited using ultrahigh vacuum chemical vapor deposition (UHVCVD), rapid thermal chemical vapor deposition (RTCVD), metalorganic chemical vapor deposition (MOCVD), low-pressure chemical vapor deposition (LPCVD), or limited reaction processing CVD (LRPCVD). As depicted in FIG. 5C, the spacer layer 508 is patterned to form spacers 510. The spacer layer 508 can be patterned by any lithographic process or etching methodology, such as, for example, a wet etch, a dry etch, or a combination of sequential wet and/or dry etches. In some embodiments of the present invention, the spacer layer 508 is patterned using an RIE. In some embodiments of the present invention, the RIE is selective to the sacrificial mandrels 506 and/or the hard mask layer 502.

As depicted in FIGS. 5D and 5E, the sacrificial mandrels 506 are removed and the hard mask layer 502 is patterned while the spacers 510 serve as an etch mask. The sacrificial mandrels 506 can be removed by any lithographic process or etching methodology, such as, for example, a photoresist stripping process, an ashing process, a wet etch, a dry etch, or a combination of sequential wet and/or dry etches. In some embodiments of the present invention, the spacer layer 508 is patterned using an RIE. In some embodiments of the present invention, the RIE is selective to the spacers 510 and/or the hard mask layer 502. The hard mask layer 502 can be patterned using, for example, a wet etch, a dry etch, or a combination of sequential wet and/or dry etches. In some embodiments of the present invention, the hard mask layer 502 is patterned using an RIE. In some embodiments of the present invention, the RIE is selective to the spacers 510.

After patterning the hard mask layer 502, the spacers 510 are removed as depicted in FIG. 5F. The spacers 510 can be removed using any suitable process, such as a wet etch, a dry etch, or a combination of sequential wet and/or dry etches. The remaining patterned portions of the hard mask layer 502 define and separate alternating "mandrel" and "non-mandrel" regions. These regions can then be filled to form mandrel and non-mandrel tracks (not depicted). A "mandrel" track refers to an integrated circuit track formed in a region originally filled with a sacrificial mandrel (as depicted in FIG. 5C). A "non-mandrel" track refers to an integrated circuit track formed in a region that was between sacrificial mandrels.

FIG. 6A depicts a top-down view of a single integrated circuit layer 600 during an intermediate operation of a method of fabricating a semiconductor device according to one or more embodiments of the invention. As depicted in FIG. 6A, the integrated circuit layer 600 includes alternating mandrel tracks 602 and non-mandrel tracks 604. The mandrel tracks 602 and non-mandrel tracks 604 can be formed using any suitable process. In some embodiments of the present invention, the mandrel tracks 602 and non-mandrel tracks 604 are formed in a similar manner as depicted in FIGS. 5A to 5F. One or more mandrel track trim shapes 606 and non-mandrel track trim shapes 608 are formed over the integrated circuit layer 600. The mandrel track trim shapes 606 and non-mandrel track trim shapes 608 combine to define pattern cuts (known as a cut mask or trim mask) which are used to remove portions of the mandrel tracks 602 and non-mandrel tracks 604. The mandrel tracks 602 and non-mandrel tracks 604 can then be patterned using the cut mask as depicted in FIG. 6B.

Figure 7:
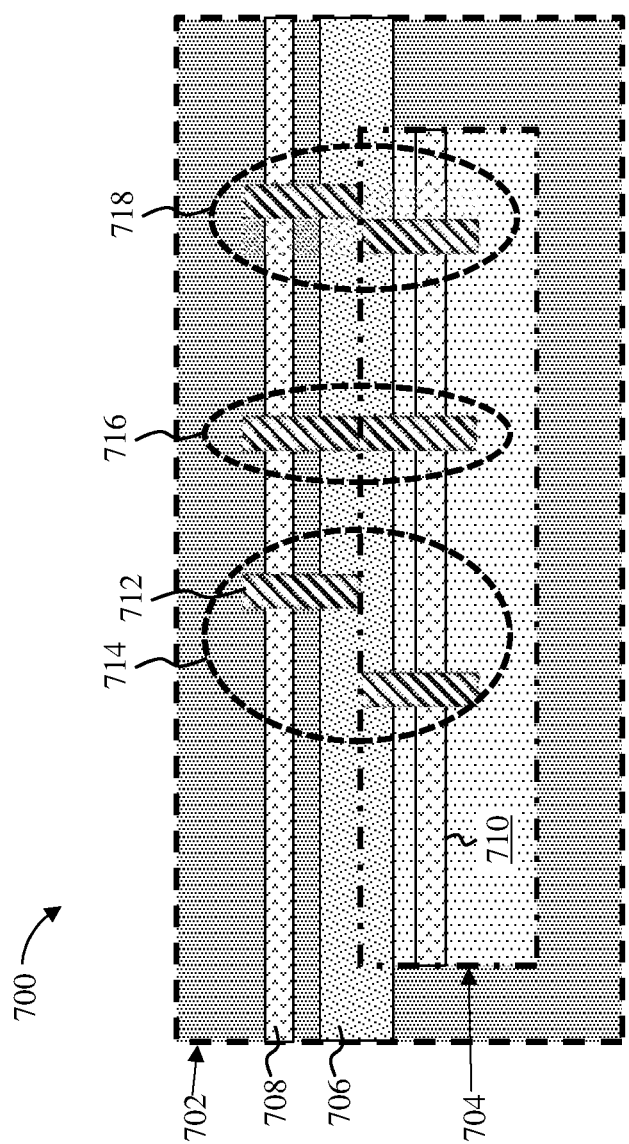
FIG. 7 depicts a top-down view of an integrated circuit after trim patterning using an unconstrained router during an intermediate operation of a method of fabricating a semiconductor device according to one or more embodiments of the invention.

FIG. 7 depicts a top-down view of an integrated circuit 700 after trim patterning using an unconstrained router during an intermediate operation of a method of fabricating a semiconductor device according to one or more embodiments of the invention. The integrated circuit 700 includes a parent hierarchy block 702 and a child hierarchy block 704. A shared power rail 706 traverses the integrated circuit 700 at the boundary between the parent hierarchy block 702 and the child hierarchy block 704. A signal wire 708 crosses the parent hierarchy block 702 and a signal wire 710 crosses the child hierarchy block 704. While illustrated as a single parent and child hierarchy having a limited set of signal wires and power rails, it is understood that the integrated circuit 700 can include any number of parent and child hierarchies, each having any number of signal wires and power rails.

As discussed previously herein, unconstrained routers can cause trim spacing violations on one or more SADP layers when device features (e.g., signal lines, power rails) cross hierarchical boundaries. As depicted in FIG. 7, a router has placed a pattern of trim shapes 712 over the integrated circuit 700. The pattern of trim shapes includes a first grouping 714, a second grouping 716, and a third grouping 718. Each grouping includes a parent trim shape and a child trim shape directly adjacent to the hierarchical boundary. The first grouping 714 is valid because the offset distance between the trim shape in the parent hierarchy and the trim shape in the child hierarchy is sufficient to satisfy trim spacing rules. The second grouping 716 is valid because the distance between the trim shapes is substantially zero and the two trim shapes act as a single larger trim shape. The third grouping 718 is invalid because the offset distance between the trim shape in the parent hierarchy and the trim shape in the child hierarchy is not sufficient to satisfy trim spacing rules.

Figure 8:
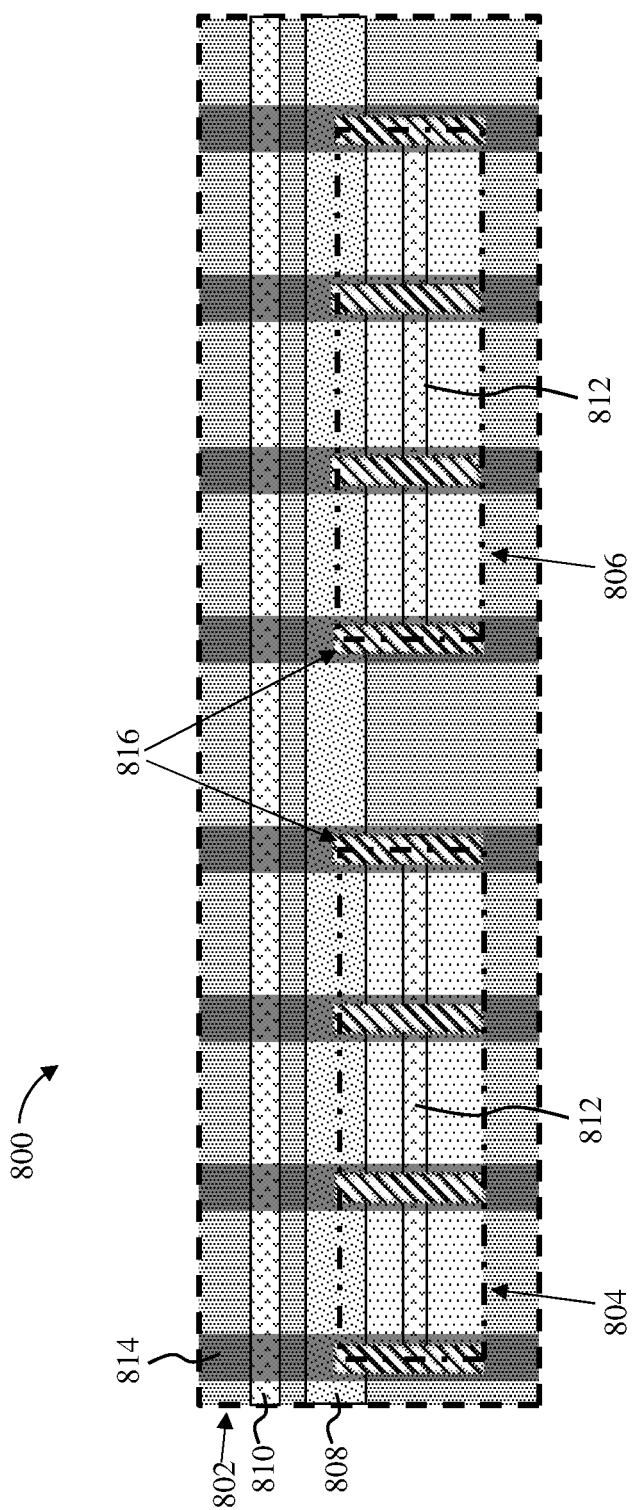
FIG. 8 depicts a top-down view of an integrated circuit after trim patterning using a hierarchical trim management system according to one or more embodiments of the invention.

FIG. 8 depicts a top-down view of an integrated circuit 800 after trim patterning using a hierarchical trim management system according to one or more embodiments of the invention. The integrated circuit 800 includes a parent hierarchy block 802 and child hierarchy blocks 804 and 806. A shared power rail 808 horizontally traverses the integrated circuit 800 at the boundary between the parent hierarchy block 802 and the child hierarchy blocks 804 and 806. A signal wire 810 crosses the parent hierarchy block 802 and signal wires 812 cross each of the child hierarchy blocks 804 and 806. A plurality of equally spaced shared power rails 814 vertically traverses the integrated circuit 800 across the boundary between the parent hierarchy block 802 and the child hierarchy blocks 804 and 806. While illustrated as a single parent having two child hierarchies and a limited set of signal wires and power rails, it is understood that the integrated circuit 800 can include any number of parent and child hierarchies, each having any number of signal wires and power rails.

To prevent trim spacing violations across hierarchy, the router trim placement is restricted to one or more legal trim regions 816. The legal trim regions 816 are tied to a fixed grid and offset to ensure trim spacing consistency at the boundaries between the parent hierarchy block 802 and the child hierarchy blocks 804 and 806. In some embodiments of the present invention, the fixed grid is tied to a power rail periodicity with zero offset. This configuration is convenient because the shared power rails 814 are already shared across hierarchy. It is understood, however, that the legal trim regions 816 can be fixed to other grids having other offsets, depending on the configuration of a given integrated circuit. Restricting the router trim placement in this manner advantageously prevents trim spacing violations across hierarchy and allows for access to the signal wire track above and below each hierarchical boundary (e.g., the signal wires 810 and 812) without needing to populate a circuit row with dummy cells.

There are two primary mechanisms for implementing a hierarchical trim management system having legal trim areas tied to a fixed grid as depicted in FIG. 8. The first option is to set the router to restrict any trim placement for the entire design (i.e., across all hierarchies) to follow a single fixed grid. This approach is relatively easy to implement but is unnecessarily restrictive. The second approach is to have each side of each hierarchical boundary represent virtual trim shapes on a fixed grid regardless of whether or not these trim shapes actually exist. In other words, during child design the child hierarchy sees one or more virtual trim shapes affixed to a fixed grid coming from the parent hierarchy. These virtual trim shapes enforce gridding in the child at the hierarchical boundary even if they do not actually exist in the parent. Similarly, during parent design the parent hierarchy sees one or more virtual trim shapes affixed to a fixed grid coming from the child hierarchy.

Figure 9:
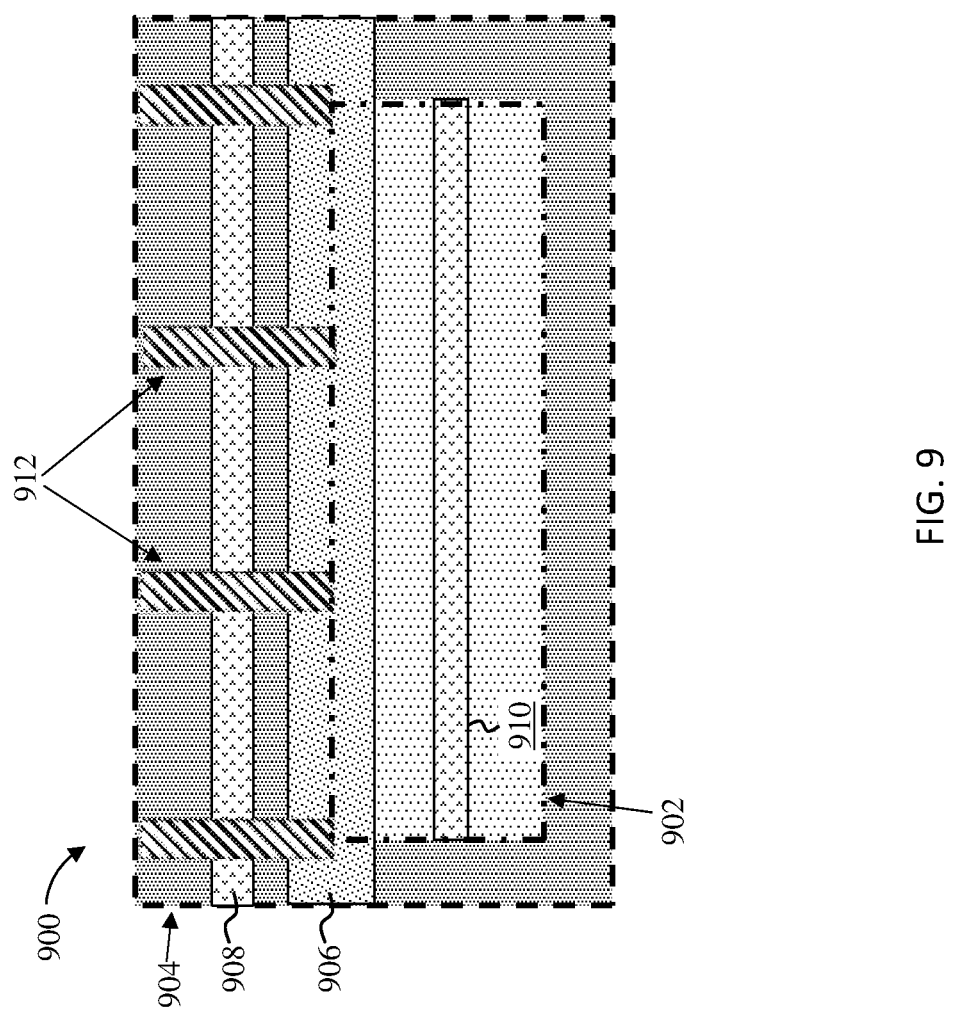
FIG. 9 depicts a top-down view of an integrated circuit from the perspective of a child hierarchy block during an intermediate operation of a method of trim patterning using a hierarchical trim management system according to one or more embodiments of the invention.

FIG. 9 depicts a top-down view of an integrated circuit 900 from the perspective of a child hierarchy block 902 during an intermediate operation of a method of trim patterning using a hierarchical trim management system according to one or more embodiments of the invention. The integrated circuit 900 includes a parent hierarchy block 904, a shared power rail 906, signal wires 908 and 910 as well as one or more legal trim areas 912. As depicted, from the child's perspective the parent hierarchy block 904 includes four virtual trim shapes 912. In this manner, the virtual trim shapes 912 are tied to a fixed grid (i.e., the virtual trim shapes 912 are separated by a fixed periodicity). As will be discussed below, these virtual trim shapes 912 can be leveraged to generate legal trim areas that prevent trim spacing violations across hierarchy.

Figure 10:
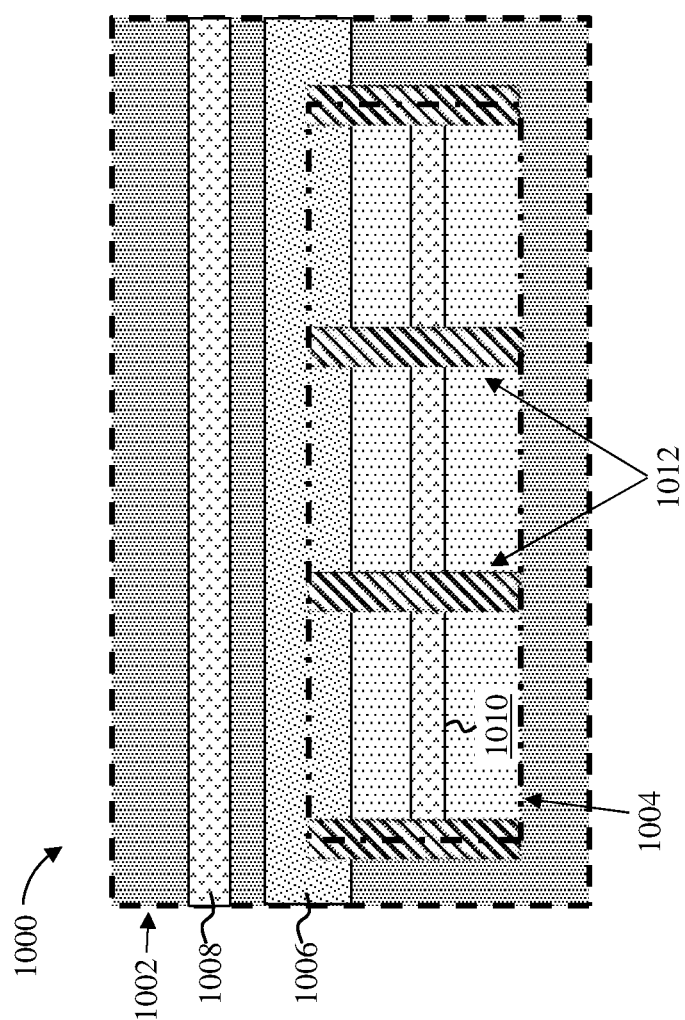
FIG. 10 depicts a top-down view of an integrated circuit from the perspective of a parent hierarchy block during an intermediate operation of a method of trim patterning using a hierarchical trim management system according to one or more embodiments of the invention.

FIG. 10 depicts a top-down view of an integrated circuit 1000 from the perspective of a parent hierarchy block 1002 during an intermediate operation of a method of trim patterning using a hierarchical trim management system according to one or more embodiments of the invention. The integrated circuit 1000 includes a child hierarchy block 1004, a shared power rail 1006, signal wires 1008 and 1010 as well as one or more legal trim areas 1012. As depicted, from the parent's perspective the child hierarchy block 1004 includes four virtual trim shapes 1012. The virtual trim shapes 1012 are tied to a fixed grid (i.e., the virtual trim shapes 1012 are separated by a fixed periodicity). As will be discussed below, these virtual trim shapes 1012 can be leveraged to generate legal trim areas that prevent across hierarchy trim spacing violations.

There are two primary modes for leveraging virtual trim shapes to generate legal trim areas that prevent across hierarchy trim spacing violations. For relatively small trim pitches (i.e., for trim pitches less than 2*MinTrimSpacing+ MinTrimWidth, where MinTrimSpacing and MinTrimWidth are the minimum possible trim spacing and widths, respectively, as limited by the foundry) the router is forced to abut new trim to the virtual trim shapes aligned with the trim grid, as otherwise trim spacing constraints would be violated. In other words, the legal trim locations are positioned to abut the virtual trim shapes, and consequently, the legal trim locations are aligned with the fixed trim grid (as depicted in FIG. 11). For relatively larger trim pitches (i.e., for trim pitches greater than or equal to 2*MinTrimSpacing+ MinTrimWidth) the router is forced to treat the virtual trim shapes as trim lockouts. In other words, new trim is positioned between the virtual trim shapes (as depicted in FIG. 12).

FIG. 11 depicts a top-down view of an integrated circuit 1100 during an intermediate operation of a method of trim patterning using trim abutment in a hierarchical trim management system according to one or more embodiments of the invention. The integrated circuit 1100 includes a parent hierarchy block 1102 and child hierarchy blocks 1104. A shared power rail 1106 horizontally traverses the integrated circuit 1100 at the boundary between the parent hierarchy block 1102 and the child hierarchy blocks 1104. A signal wire 1108 crosses the parent hierarchy block 1102 and signal wires 1110 cross each of the child hierarchy blocks 1104.

From the perspective of the child hierarchy blocks 1104, the parent hierarchy block 1102 is representing one or more virtual trim shapes 1112. As discussed previously herein, virtual trim shapes can be pure constructs or can represent actual, real trim shapes in the other hierarchy. In some embodiments of the present invention, some of the virtual trim shapes 1112 are constructs while others are real. To prevent trim spacing violations across hierarchy, the router is forced to abut new trim in the child hierarchy blocks 1104 to these virtual trim shapes 1112. In other words, a legal trim grid 1114 is positioned in the child hierarchy blocks 1104 directly adjacent to (i.e., abutting) the virtual trim shapes 1112. In this manner, the legal trim grid 1114 serves as a positive-space type trim blockage. While FIG. 11 depicts trim abutment from the perspective of the child hierarchy blocks 1104, it is understood that the same approach can be used for the parent hierarchy block 1102. In other words, legal trim areas in a parent can be forced to abut virtual trim shapes represented from a child.

FIG. 12 depicts a top-down view of an integrated circuit 1200 during an intermediate operation of a method of trim patterning using trim lockouts in a hierarchical trim management system according to one or more embodiments of the invention. The integrated circuit 1200 includes a parent hierarchy block 1202 and child hierarchy blocks 1204. A shared power rail 1206 horizontally traverses the integrated circuit 1200 at the boundary between the parent hierarchy block 1202 and the child hierarchy blocks 1204. A signal wire 1208 crosses the parent hierarchy block 1202 and signal wires 1210 cross each of the child hierarchy blocks 1204.

From the perspective of the child hierarchy blocks 1204, the parent hierarchy block 1202 is representing one or more virtual trim shapes 1212. As discussed previously herein, virtual trim shapes can be pure constructs or can represent actual, real trim shapes in the other hierarchy. In some embodiments of the present invention, some of the virtual trim shapes 1212 are constructs while others are real. To prevent across hierarchy trim spacing violations, the router is forced to treat the virtual trim shapes 1212 as trim lockout regions (i.e., regions where new trim shapes are prohibited). In other words, a legal trim grid 1214 is positioned in the child hierarchy blocks 1204 between the virtual trim shapes 1212. In this manner, the legal trim grid 1214 serves as a negative-space type trim blockage. In other words, trim lockout regions can be sized and positioned based on the trim spacing rules such that new trim placement cannot legally fit in the trim lockout regions. While FIG. 12 depicts trim lockouts from the perspective of the child hierarchy blocks 1204, it is understood that the same approach can be used for the parent hierarchy block 1202. In other words, legal trim areas in a parent can be forced between virtual trim shapes represented from a child.

Figure 13:
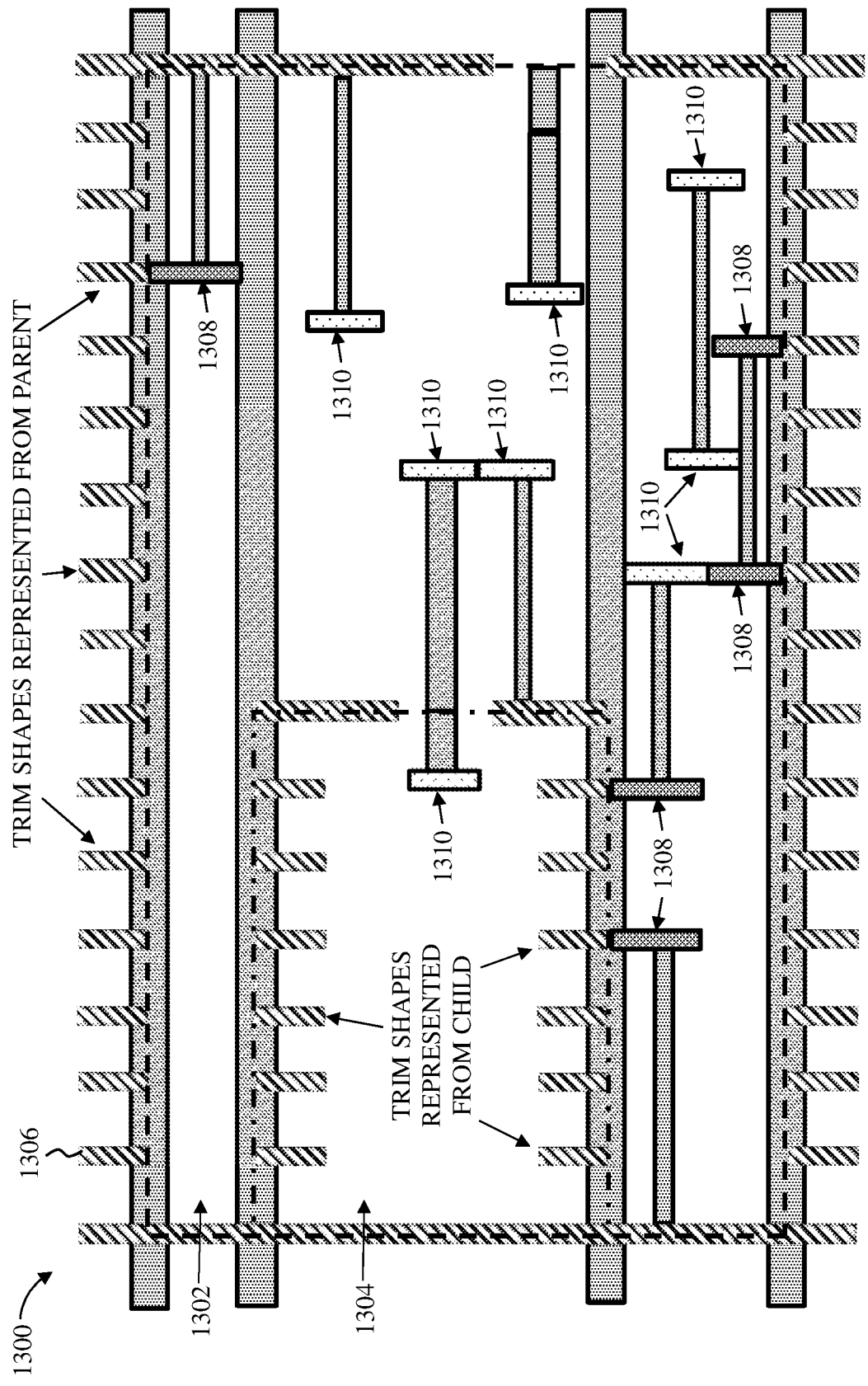
FIG. 13 depicts a top-down view of an integrated circuit during an intermediate operation of a method of trim patterning in a hierarchical trim management system according to one or more embodiments of the invention.

FIG. 13 depicts a top-down view of an integrated circuit 1300 during an intermediate operation of a method of trim patterning in a hierarchical trim management system according to one or more embodiments of the invention. The integrated circuit 1300 includes a parent hierarchy block 1302 and a child hierarchy block 1304. The parent hierarchy block 1302 is itself a child hierarchy from the perspective of a larger parent block (not depicted). This larger parent block and the child hierarchy block 1304 are representing virtual trim shapes 1306 to the parent hierarchy block 1302. In some embodiments of the present invention, the virtual trim shapes 1306 define a fixed grid for placing valid trim shapes across hierarchy according to one or more embodiments of the present invention.

As depicted, one or more trim shapes 1308 are forced to abut one of the virtual trim shapes 1306 at the boundary between the parent hierarchy block 1302 and the child hierarchy block 1304 and at the boundary between the parent hierarchy block 1302 and the still larger parent block (not depicted). While FIG. 13 illustrates the use of trim abutment for hierarchical trim management, it is understood that one or more of the virtual trim shapes 1306 can serve as trim lockouts as previously described herein. Internal trim shapes 1310 (i.e., trim shapes in the parent hierarchy block 1302 which are not adjacent to a parent-child hierarchical boundary) need not align to the fixed grid of virtual trim shapes 1306. In other words, the router is not forced to abut internal trim shapes 1310 to virtual trim shapes 1306. As described previously herein, it is unnecessarily restrictive to require the router to respect a fixed grid for internal trim shapes.

Figure 14:
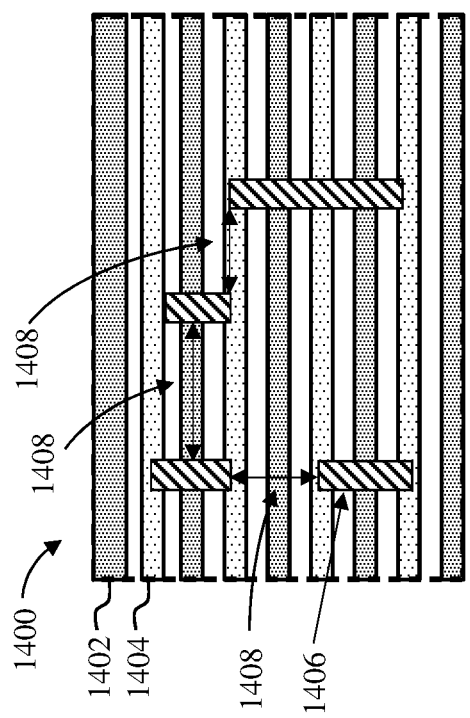
FIG. 14 depicts manufacturing design rules for trim shape spacing according to one or more embodiments of the invention.

FIG. 14 depicts manufacturing design rules for trim shape spacing on an integrated circuit layer 1400 according to one or more embodiments of the invention. As depicted in FIG. 14, the integrated circuit layer 1400 includes alternating mandrel tracks 1402 and non-mandrel tracks 1404. One or more trim shapes 1406 are formed over the integrated circuit layer 1400. As described previously herein, the trim shapes 1406 define pattern cuts (known as a cut mask or trim mask) which are used to remove portions of the mandrel tracks 1402 and non-mandrel tracks 1404. Trim spacing rules (design rules) 1408 restrict the placement of the trim shapes 1406. The trim spacing rules 1408 can define, for example, minimum vertical and horizontal spacing requirements between adjacent trim shapes, although other spacing rules are within the contemplated scope of the invention.

Figure 15:
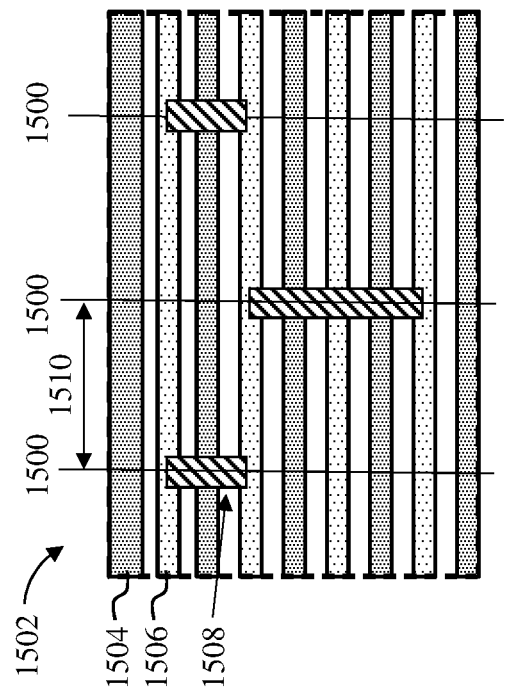
FIG. 15 depicts a trim grid according to one or more embodiments of the invention.

FIG. 15 depicts a trim grid 1500 on an integrated circuit layer 1502 according to one or more embodiments of the invention. As depicted in FIG. 15, the integrated circuit layer 1502 includes alternating mandrel tracks 1504 and non-mandrel tracks 1506. One or more trim shapes 1508 aligned with the trim grid 1500 are formed over the integrated circuit layer 1502. As discussed previously herein, the trim grid 1500 can be a real or virtual fixed grid. As depicted, the trim grid 1500 includes a fixed grid spacing 1510. The fixed grid spacing 1510 defines a vertical or horizontal distance between trim shapes.

Figure 16:
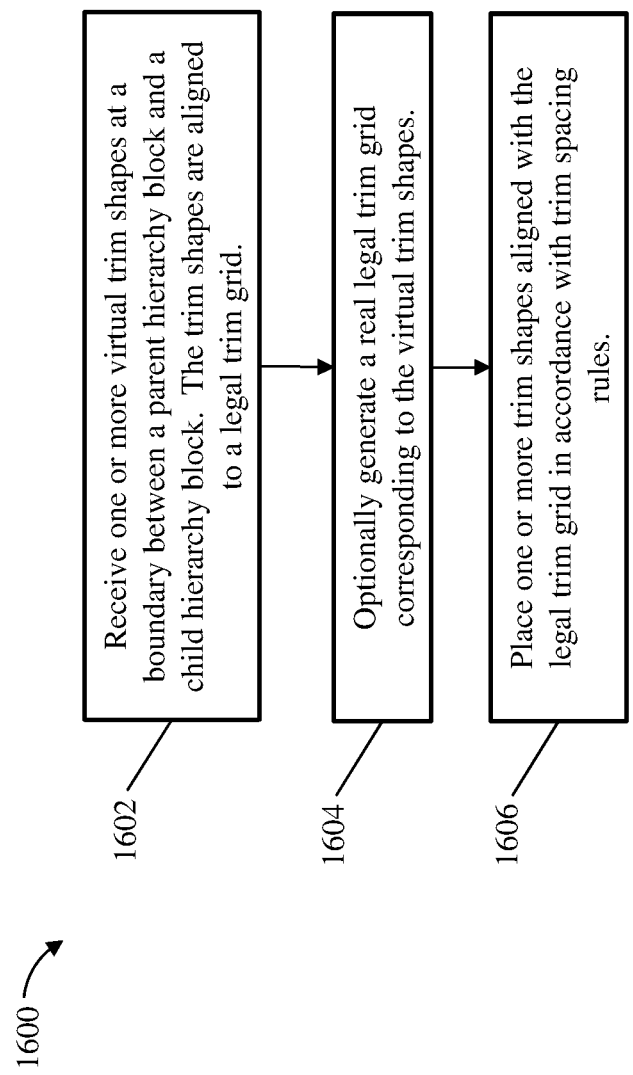
FIG. 16 depicts a flow diagram illustrating a method for implementing hierarchical trim management according to one or more embodiments of the invention.

FIG. 16 depicts a flow diagram 1600 illustrating a method for implementing hierarchical trim management according to one or more embodiments of the invention. As shown at block 1602, the system or processor receives one or more virtual trim shapes at a boundary between a parent hierarchy block and a child hierarchy block. As discussed previously herein, these virtual trim shapes can be real trim shapes or mere constructs represented to a current hierarchy block from a parent or child hierarchy block. The virtual trim shapes are formed on a real or virtual fixed grid.

At block 1604, the system or processor optionally generates a legal trim grid aligned with the virtual trim shapes. The legal trim grid can be generated according to one or more embodiments of the present invention. In some embodiments of the present invention, an actual legal trim grid is not separately generated, rather, the presence of the virtual trim shapes forces routing to respect the trim spacing dimensions of the virtual trim. As the virtual trim shapes are formed on a real or virtual fixed grid, new trim placed during routing will necessarily be aligned with the fixed grid.

At block 1606, the system or processor places one or more trim shapes aligned with the fixed grid in the current hierarchy according to one or more embodiments of the present invention. For example, a router can be forced to place new trim shapes for a current hierarchy block on the legal trim grid by the presence of the virtual trim shapes. In some embodiments of the present invention, a router is forced to place trim shapes within a current hierarchy block such that those trim shapes abut the virtual trim shapes (FIG. 11). In some embodiments of the present invention, a router is forced to place trim shapes within a current hierarchy block such that those trim shapes are placed between adjacent pairs of virtual trim shapes (FIG. 12).

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second structure, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, are used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (e.g., rotated 90 degrees or at other orientations), and the spatially relative descriptors used herein should be interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrase "selective to," such as, for example, "a first element selective to a second element," means that the first element can be etched and the second element can act as an etch stop.

The term "conformal" (e.g., a conformal layer) means that the thickness of the layer is substantially the same on all surfaces, or that the thickness variation is less than 15% of the nominal thickness of the layer.

As previously noted herein, for the sake of brevity, conventional techniques related to a semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), chemical-mechanical planarization (CMP), and the like. Reactive ion etching (RIE), for example, is a type of dry etching that uses chemically reactive plasma to remove a material, such as a masked pattern of semiconductor material, by exposing the material to a bombardment of ions that dislodge portions of the material from the exposed surface. The plasma is typically generated under low pressure (vacuum) by an electromagnetic field. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for hierarchical trim management, the method comprising:
    receiving, by a processor, one or more virtual trim shapes at a boundary between a parent hierarchy block and a child hierarchy block, the one or more virtual trim shapes aligned to a legal trim grid;
    restricting, by the processor, a router during trim placement to a legal trim area constructed such that the router is forced to abut new trim to the one or more virtual trim shapes for trim pitches less than a threshold, and the router is forced to treat the one or more virtual trim shapes as trim lockouts for trim pitches greater than the threshold; and
    placing, by the processor, one or more new trim shapes aligned with the legal trim area.

2. The method of claim 1, wherein the legal trim grid comprises one or more legal trim regions.

3. The method of claim 2, wherein each of the one or more legal trim regions abuts a virtual trim shape.

4. The method of claim 2, wherein each of the one or more legal trim regions is between a pair of virtual trim shapes.

5. The method of claim 1, wherein the legal trim grid is fixed to a power rail periodicity with zero offset.

6. The method of claim 1 further comprising receiving, by the processor, a first hierarchy block and a second hierarchy block.

7. The method of claim 6, wherein a shared power rail traverses the first and second hierarchy blocks.

8. The method of claim 6, wherein a first plurality of signal wires traverses the first hierarchy block and a second plurality of signal wires traverses the second hierarchy block.

9. The method of claim 6, wherein the first hierarchy block is a parent hierarchy block with respect to the second hierarchy block.

10. A system for hierarchical management of self-aligned double patterning (SADP) trim shapes, the system having a processor coupled to a memory, the processor configured to:
    receive one or more virtual trim shapes at a boundary between a parent hierarchy block and a child hierarchy block, the one or more virtual trim shapes aligned to a legal trim grid;
    restrict a router during trim placement to a legal trim area constructed such that the router is forced to abut new trim to the one or more virtual trim shapes for trim pitches less than a threshold, and the router is forced to treat the one or more virtual trim shapes as trim lockouts for trim pitches greater than the threshold; and
    place one or more new trim shapes aligned with the legal trim area.

11. The system of claim 10, wherein the legal trim grid comprises one or more legal trim regions.

12. The system of claim 11, wherein each of the one or more legal trim regions abuts a virtual trim shape.

13. The system of claim 11, wherein each of the one or more legal trim regions is between a pair of virtual trim shapes.

14. The system of claim 10 further comprising receiving, by the processor, a first hierarchy block and a second hierarchy block.

15. The system of claim 14, wherein the first hierarchy block is a parent hierarchy block with respect to the second hierarchy block.

16. A computer program product for hierarchical trim management, the computer program product comprising a computer readable storage medium having program instructions embodied therewith, the program instructions executable by a processor to cause the processor to:
    receive one or more virtual trim shapes at a boundary between a parent hierarchy block and a child hierarchy block, the one or more virtual trim shapes aligned to a legal trim grid;
    restrict a router during trim placement to a legal trim area constructed such that the router is forced to abut new trim to the one or more virtual trim shapes for trim pitches less than a threshold, and the router is forced to treat the one or more virtual trim shapes as trim lockouts for trim pitches greater than the threshold; and
    place one or more new trim shapes aligned with the legal trim area.

17. The computer program product of claim 16, wherein the legal trim grid comprises one or more legal trim regions.

18. The computer program product of claim 17, wherein each of the one or more legal trim regions abuts a virtual trim shape.

19. The computer program product of claim 17, wherein each of the one or more legal trim regions is between a pair of virtual trim shapes.

20. The computer program product of claim 16 further comprising receiving, by the processor, a first hierarchy block and a second hierarchy block, wherein the first hierarchy block is a parent hierarchy block with respect to the second hierarchy block.

* * * * *